(12) United States Patent
Kwon et al.

(10) Patent No.: US 8,041,297 B2
(45) Date of Patent: Oct. 18, 2011

(54) METHOD FOR SUPPORTING PEER-TO-PEER COMMUNICATION IN A WIRELESS COMMUNICATION SYSTEM

(75) Inventors: Il-Won Kwon, Ansan-si (KR); Yung-Soo Kim, Seongnam-si (KR); Sang-Min Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 12/169,403

(22) Filed: Jul. 8, 2008

(65) Prior Publication Data
US 2009/0017857 A1 Jan. 15, 2009

(30) Foreign Application Priority Data
Jul. 9, 2007 (KR) .................. 10-2007-0068845

(51) Int. Cl.
*H04B 7/00* (2006.01)
(52) U.S. Cl. ....... 455/41.2; 455/517; 455/502; 455/416; 455/90.2; 455/3.05; 455/127.5; 370/206
(58) Field of Classification Search ............ 455/41.2, 455/519, 518, 517, 503, 502, 415, 416, 445, 455/90.2, 3.05, 127.5, 522, 13.4; 370/206, 370/338
See application file for complete search history.

(56) References Cited

U.S. PATENT DOCUMENTS

| 2003/0040315 | A1 | 2/2003 | Khaleghi et al. |
| 2005/0021872 | A1* | 1/2005 | Poustchi et al. ............ 709/250 |
| 2005/0094601 | A1 | 5/2005 | Hsu et al. |
| 2005/0239451 | A1* | 10/2005 | Periyalwar et al. .......... 455/425 |
| 2006/0099956 | A1* | 5/2006 | Harada et al. ............. 455/452.2 |
| 2007/0004436 | A1* | 1/2007 | Stirbu .......................... 455/503 |
| 2007/0070996 | A1* | 3/2007 | Oran ............................ 370/389 |
| 2010/0172317 | A1* | 7/2010 | Rajamani et al. ............ 370/330 |

FOREIGN PATENT DOCUMENTS

| KR | 10-2004-0029416 A | 4/2004 |
| KR | 10-2006-0005641 A | 1/2006 |
| KR | 10-2007-0069360 A | 7/2007 |

* cited by examiner

*Primary Examiner* — Shaima Q Aminzay
(74) *Attorney, Agent, or Firm* — Jefferson IP Law, LLP

(57) ABSTRACT

A method for supporting a Peer-to-Peer (P2P) communication in a wireless communication system is provided. The method includes identifying whether a Mobile Station (MS) is in a wireless communication active state, a P2P active state, or a P2P previous active state, and transiting to the P2P active state if a P2P connection request occurs in the P2P previous active state and transiting to the P2P previous active state if a P2P communication termination occurs in the P2P active state.

12 Claims, 4 Drawing Sheets

METHOD FOR SUPPORTING PEER-TO-PEER COMMUNICATION IN A WIRELESS COMMUNICATION SYSTEM

PRIORITY

This application claims the benefit under 35 U.S.C. §119(a) of a Korean patent application filed in the Korean Intellectual Property Office on Jul. 9, 2007 and assigned Serial No. 2007-68845, the entire disclosure of which is hereby incorporated by reference.

BACKGROUND OF THE INVENTION

1. Field of the Invention

The present invention relates to a method for supporting a Peer-to-Peer (P2P) communication in a wireless communication. More particularly, the present invention relates to a scheme for, even if a Mobile Station (MS) is in a sleep mode or inactive mode, providing a P2P service immediately when there is a request for a P2P communication.

2. Description of the Related Art

In the conventional art, MSs use a different frequency band to perform a conventional P2P communication than a frequency band allocated to a wireless communication system. Also, MSs use a separate RF transmitting/receiving apparatus to process a different frequency band signal. For instance, an Infrared Data Association (IrDA), a Bluetooth communication and the like are used in a P2P communication. However, if the P2P communication and wireless communication use the same frequency band, bandwidth efficiency can be improved by flexibly adjusting each transmission band if an interference problem is solved by using an efficient resource management scheme. For this purpose, a WINNER system project is planned for use in Europe.

FIG. 1 is a diagram illustrating a conventional state transition of an MS in a wireless communication system.

Referring to FIG. 1, a transition state of an MS includes a first active state 100, an inactive state 102, and a P2P active state 108.

The first active state 100 is a state where an MS is in communication with a different MS through a Base Station (BS). The inactive state 102 is a state where the MS is on standby with no communication. The P2P active state 108 is a state where the MS is in a direct P2P communication with a different MS.

If there is no connection request from the BS for a preset period of time, the MS transits to the inactive state 102 from the first active state 100 to reduce power consumption, thus receiving no data for a preset period of time. The MS transits to the inactive state 102 upon wireless communication termination 104.

In the inactive state 102, the MS performs a short communication to identify whether there is data to be received from the BS, whether there is a need for handover, etc. during a preset period of time. Then, the MS returns to a reception stop state upon the lapse of the preset period of time. If there is a connection request 106 from the BS, the MS transits to the first active state 100 from the inactive state 102.

However, if the P2P communication and the wireless communication use the same frequency band, the P2P communication is carried out in a separate independent mode from the wireless communication and therefore, in the inactive state 102, the MS cannot process a P2P connection request message if there is a connection request from an MS that desires the P2P communication. Thus, a user must perform a manual transition 110 to the P2P active state for the P2P communication. Therefore, there is a disadvantage that a prompt P2P connection is not established.

As described above, because the existing P2P communication uses a different frequency band from the wireless communication, a separate RF module is required and also, a connection method is designed and managed such that the P2P communication is operated in a separate mode from the wireless communication. When the P2P communication and the wireless communication use the same frequency band, an RF module uses a single module as well. However, this may cause a problem in that the P2P communication cannot be managed in a separate mode. In other words, because an MS in an inactive mode can perform a data exchange only with a BS during a preset period of time, there is a problem that the MS cannot process P2P connection request messages received from neighboring MSs that desire the P2P communication, thus causing a difficulty in establishing a P2P communication connection.

Therefore, a need exists for an improved method for supporting a peer-to-peer communication in a wireless communication.

SUMMARY OF THE INVENTION

An aspect of the present invention is to address at least the above-mentioned problems and/or disadvantages and to provide at least the advantages described below. Accordingly, an aspect of the present invention is to provide a method for supporting a Peer-to-Peer (P2P) communication in a wireless communication system.

According to another aspect of the present invention, a method for supporting a Peer-to-Peer (P2P) communication in a wireless communication system is provided. The method includes identifying whether a Mobile Station (MS) is in a wireless communication active state where radio resources can be allocated in a first MAC layer, a P2P active state where radio resources can be allocated in a MAC layer for a P2P communication, or a P2P previous active state where a beacon message sent by a peer MS for a P2P communication can be received, and transiting to the P2P active state if a P2P connection request occurs in the P2P previous active state and transiting to the P2P previous active state if a P2P communication termination occurs in the P2P active state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms described below, which are defined considering functions in exemplary embodiments of the present invention, can be different depending on a user and operator's intention or practice. Therefore, the terms should be defined on the basis of the disclosure throughout this specification.

A method for, even if a Mobile Station (MS) is in a sleep mode or inactive mode, providing a Peer-to-Peer (P2P) service immediately when there is a request for a P2P communication, by applying a P2P previous active mode to the inactive mode of the MS if the same frequency band is used in the P2P communication and wireless communication, that is, if a single Radio Frequency (RF) module is used according to an exemplary embodiment of the present invention is described below.

Figure 1:
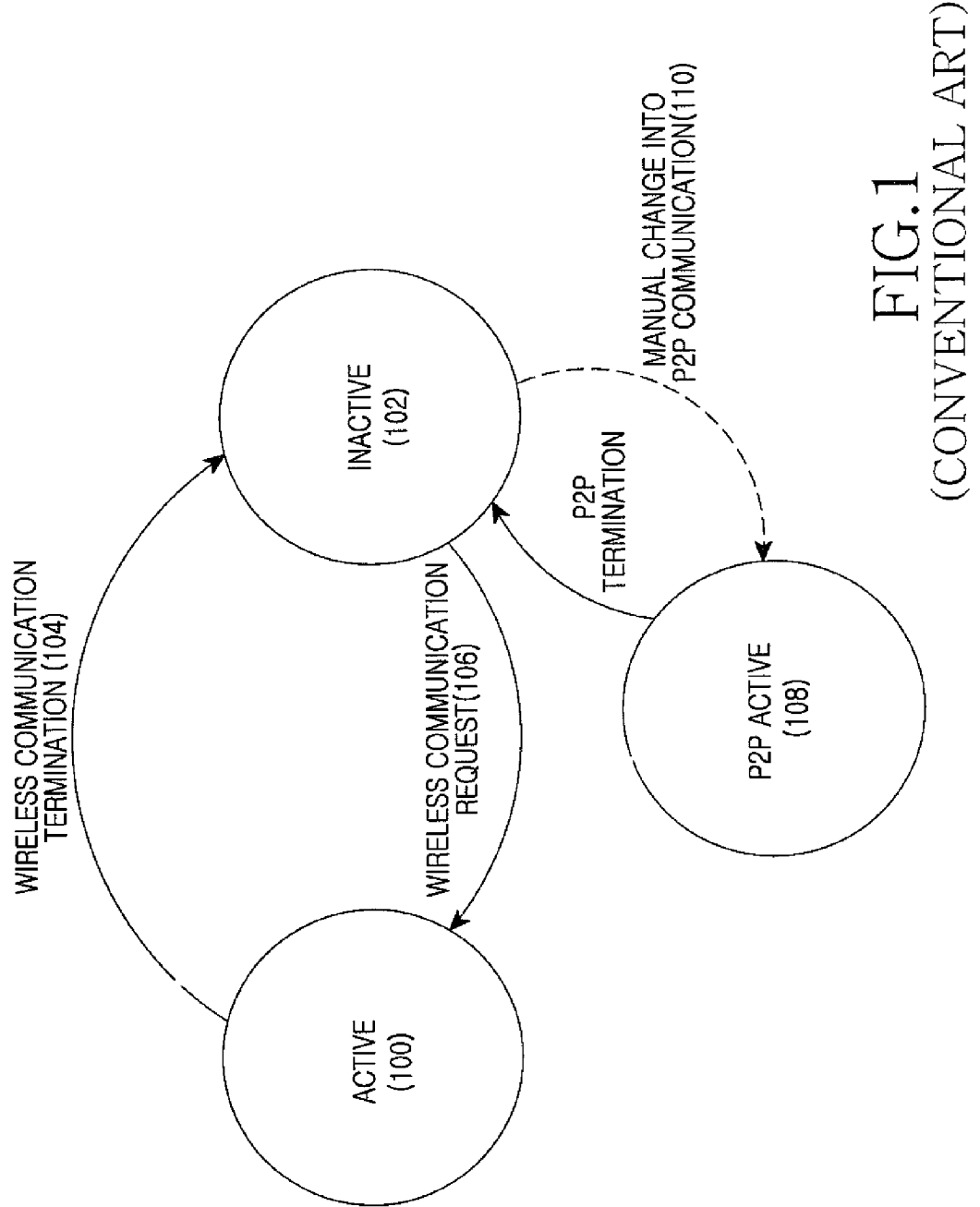
FIG. 1 is a diagram illustrating a conventional state transition of a Mobile Station (MS) in a wireless communication system.
Figure 2:
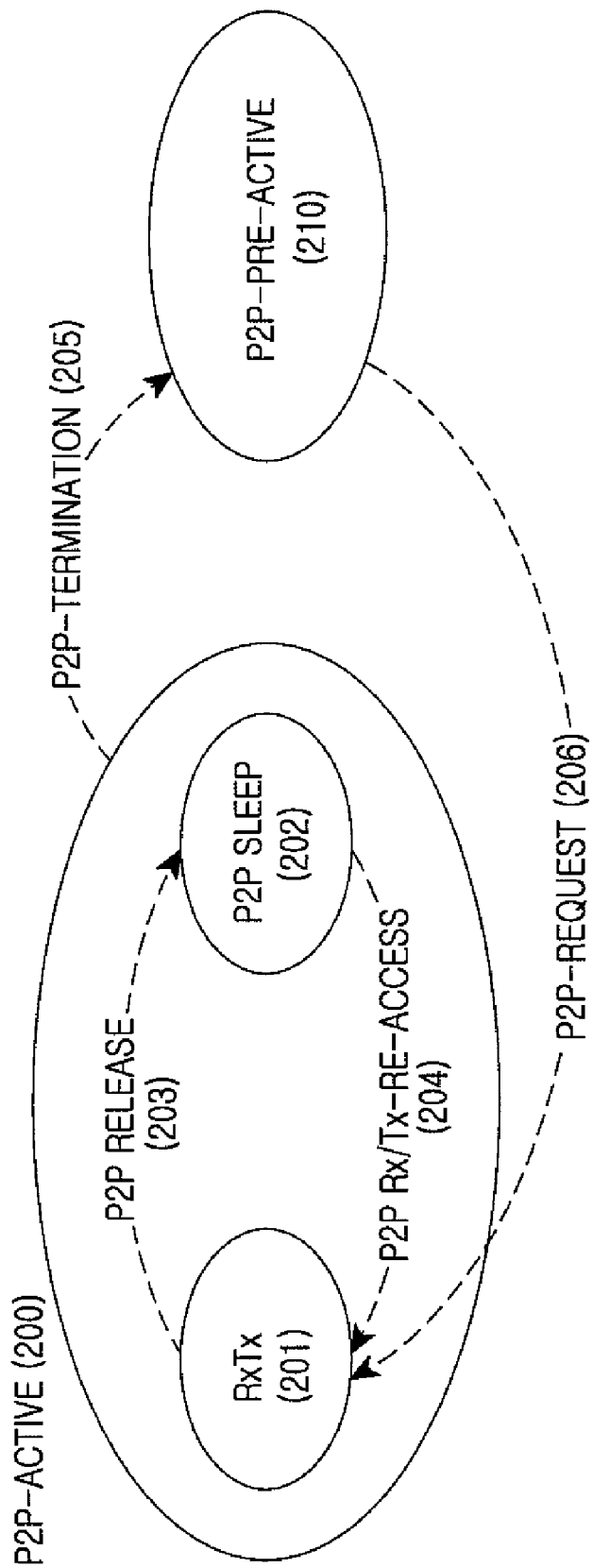
FIG. 2 is a diagram illustrating a state transition of an MS for a Peer-to-Peer (P2P) communication in a wireless communication system according to an exemplary embodiment of the present invention.

FIG. 2 is a diagram illustrating a state transition of an MS for a P2P communication in a wireless communication system according to an exemplary embodiment of the present invention.

Referring to FIG. 2, a P2P Medium Access Control (MAC) operation state includes a P2P active state (P2P-Active) 200 and a P2P previous active state (P2P-pre-active) 210.

The P2P active state 200 includes a Receive/Transmit (RxTx) state 201 where data is substantially received/transmitted and a P2P sleep state 202 where a call is opened without data transmission/reception. The RxTx state 201 represents a MAC operation state where an MS is allocated an UpLink (UL) or DownLink (DL) data channel and actually transmits/receives data. If a P2P release 203 occurs in the RxTx state 201 of the P2P active state 200, an MS transits to the P2P sleep state 202. In contrast, if a P2P Rx/Tx-Re-access 204 is needed for reception transmission in the P2P sleep state 202, the MS transits to the RxTx state 201. The P2P sleep state 202 represents a state where an MS is not allocated a UL data channel but is allocated a dedicated control channel such that it can rapidly transit, if so desired, to the P2P active state 200 in a contentionless mode because a probability of data generation is high or a level of Quality of Service (QoS) is high. The MS of the P2P sleep state 202 may receive a signal channel and therefore, can transit directly to the RxTx state 201 with no separate process or delay upon generation of DL data.

Upon transiting to the P2P previous active state 210, the MS can receive a beacon message (a connection request message) sent by a peer MS for the P2P communication. Therefore, though not occupying a data channel for the P2P communication, the MS can directly receive the connection request message (the beacon message) sent by the peer MS and can transit directly to the Rx/Tx state 201. Therefore, the MS can promptly process a P2P connection request of the peer MS.

If a P2P communication termination 205 occurs in the P2P active state 200, the MS transits to the P2P previous active state 210. If a P2P connection request 206 occurs in the P2P previous active state 210, the MS transits to the P2P active state 200. The P2P previous active state 210 is described below in detail with reference to FIG. 3.

Figure 3:
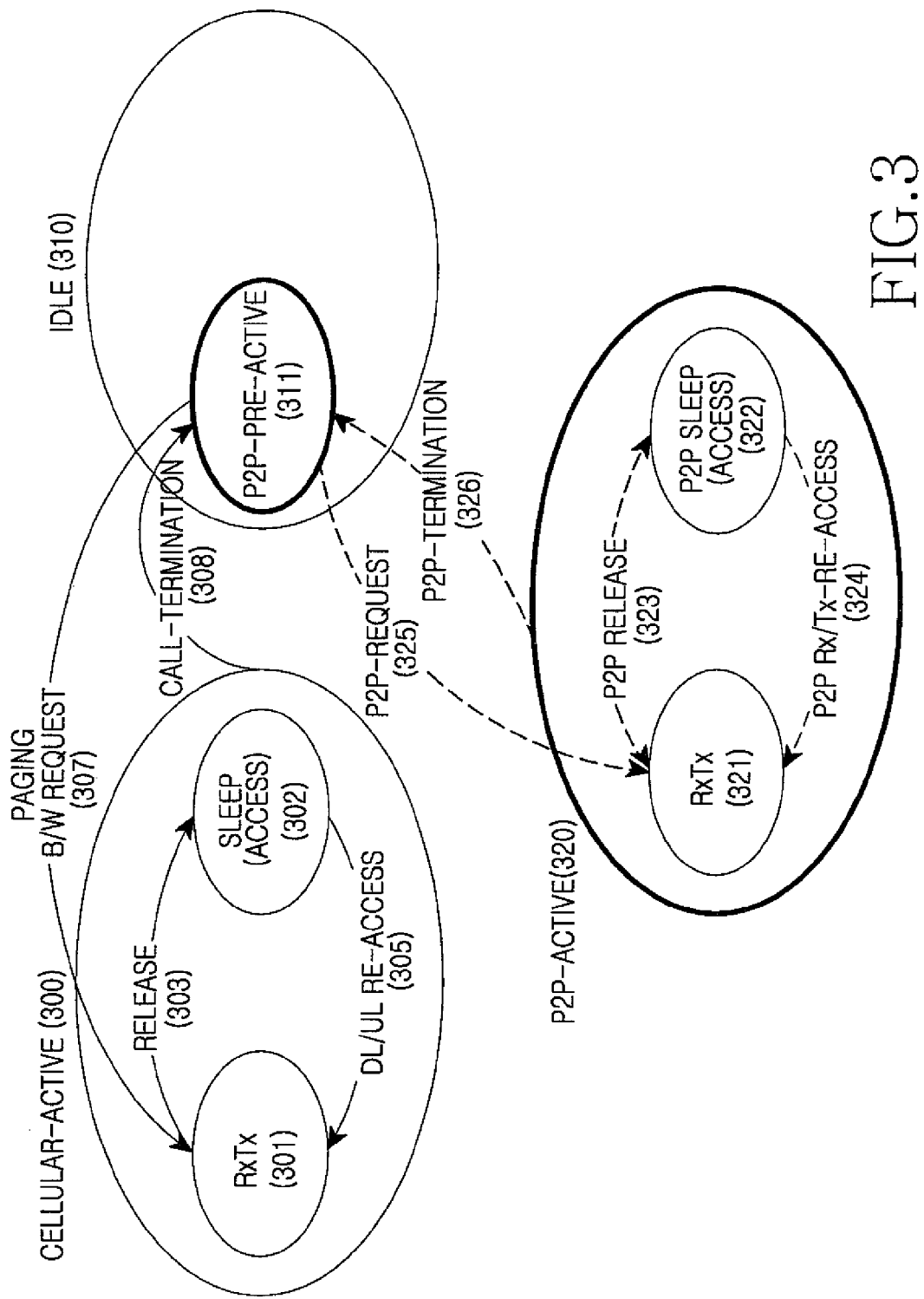
FIG. 3 is a diagram illustrating a state transition of an MS in a wireless communication system according to an exemplary embodiment of the present invention.

FIG. 3 is a diagram illustrating a state transition of an MS in a wireless communication system according to an exemplary embodiment of the present invention.

Referring to FIG. 3, a MAC operation state of an MS includes a wireless communication active state (Cellular-Active) 300, an idle state (Idle) 310, and a P2P active state (P2P-Active) 320.

The wireless communication active state 300 includes an RxTx state 301 where data is actually received/transmitted and a sleep state 302 where a call is opened with no data transmission/reception. The RxTx state 301 represents a MAC operation state where an MS is allocated a UL or DL data channel and actually transmits/receives data. If an RxTx release 303 occurs in the RxTx state 301 of the wireless communication active state 300, an MS transits to the sleep state 302. In contrast, if a DL/UL Re-access 305 is needed for transmission/reception in the sleep state 302, that is, if a resource is allocated, the MS transits to the RxTx state 301. The sleep state 302, which is a standby state for wireless communication, represents a state where an MS is not allocated a UL data channel but can be rapidly allocated a dedicated control channel because a probability of data generation is high or a level of Quality of Service (QoS) is high. The MS makes a transition 308 to the idle state 310 from the wireless communication active state 300 if the MS is in a state where there is no communication for a preset period of time, a call of the MS is correctly terminated, or the MS is in a state where there is no communication for a preset period of time after the call of the MS is correctly terminated.

Like the wireless communication active state 300, the P2P active state 320 includes an RxTx state 321 where data is actually received/transmitted for a P2P communication and a P2P sleep state 322 where a call is opened with no data transmission/reception. The RxTx state 321 represents a MAC operation state where an MS is allocated a UL or DL data channel for a P2P communication and actually transmits/receives data. If a P2P release 323 occurs in the RxTx state 321 of the P2P active state 320, the MS transits to the P2P sleep state 322. In contrast, if a P2P Rx/Tx-Re-access 324 is needed for reception/transmission in the P2P sleep state 322, the MS transits to the RxTx state 321. The P2P sleep state 322, which is a standby state for the P2P communication, represents a state where an MS is not allocated a UL data channel but may be rapidly allocated a dedicated control channel because a probability of data generation is high or a level of Quality of Service (QoS) is high. In the P2P active state 300, the MS makes a transition 326 to the idle state 310 if the MS is in a state of no P2P communication for a preset period of time, a P2P communication of the MS is correctly terminated, or the MS is in a state where there is no communication for a preset period of time after the P2P communication of the MS is correctly terminated.

In the idle state 310, the MS may receive call channel monitoring, an idle handoff, a call channel message, and the like. Further, exemplary embodiments of the present invention include a P2P previous active state 311 where an MS may receive a beacon message, etc. sent by a peer MS for the P2P communication. The MS transits to the P2P previous active state 311 if a call termination 308 occurs in the wireless communication active state 300 or a P2P communication termination 326 occurs in the P2P active state 320. On the contrary, the MS transits to the RxTx state 301 from the P2P previous active state 311 when a paging or BandWidth (B/W) request 307 exists. The MS transits to the RxTx state 321 when a P2P connection request 325 exists. By this, the MS is ready to receive a control message for the wireless communication and a control message for the P2P communication in the P2P previous active state 311.

For example, "P2P_SETUP_READY", "P2P_SLP_REQ", etc. are messages that an MS may receive for a P2P connection request after transiting to the P2P previous active state 311. The P2P_SETUP_READY message is a message for enabling a BS to broadcast to MSs and seek a peer MS. Upon receipt of the P2P_SETUP_READY message, the MS is ready to receive a message of a neighboring MS by transiting to the Rx/Tx state 321 of the P2P active state 320. Also, a P2P active state 320 mode is applicable to a group sleep mode. The P2P_SLP_REQ message is used for enabling a peer MS to request the group sleep mode if an MS is in the P2P sleep state 322.

A description of a P2P operation in a P2P previous active state 311 mode is made below.

When an Rx link data traffic is generated, an MS completes a P2P connection setup by transiting to the P2P active state 320 if receiving a P2P setup ready signal from a BS in accordance with a P2P Neighbor Discovery (PND) and a Direct P2P Neighbor Discovery (DPND) mechanism and receiving a PNR request and a P2P setup neighbor request message from a peer MS that desires a P2P communication.

When Tx link data traffic is generated, an MS sends a P2P setup request message to a BS through a Contention Access Period (CAP)-based P2P connection process. If so, the BS broadcasts a P2P setup ready message to MSs. Then, a P2P Neighbor Report (PNR) request message is sent to an MS and if so, the receiving MS directly sends a PNR response message to the BS or an MS which has sent the PNR request message. Then, the MS, which sends a P2P setup request message, sends a P2P setup neighbor request message, thus completing a P2P connection setup.

Figure 4:
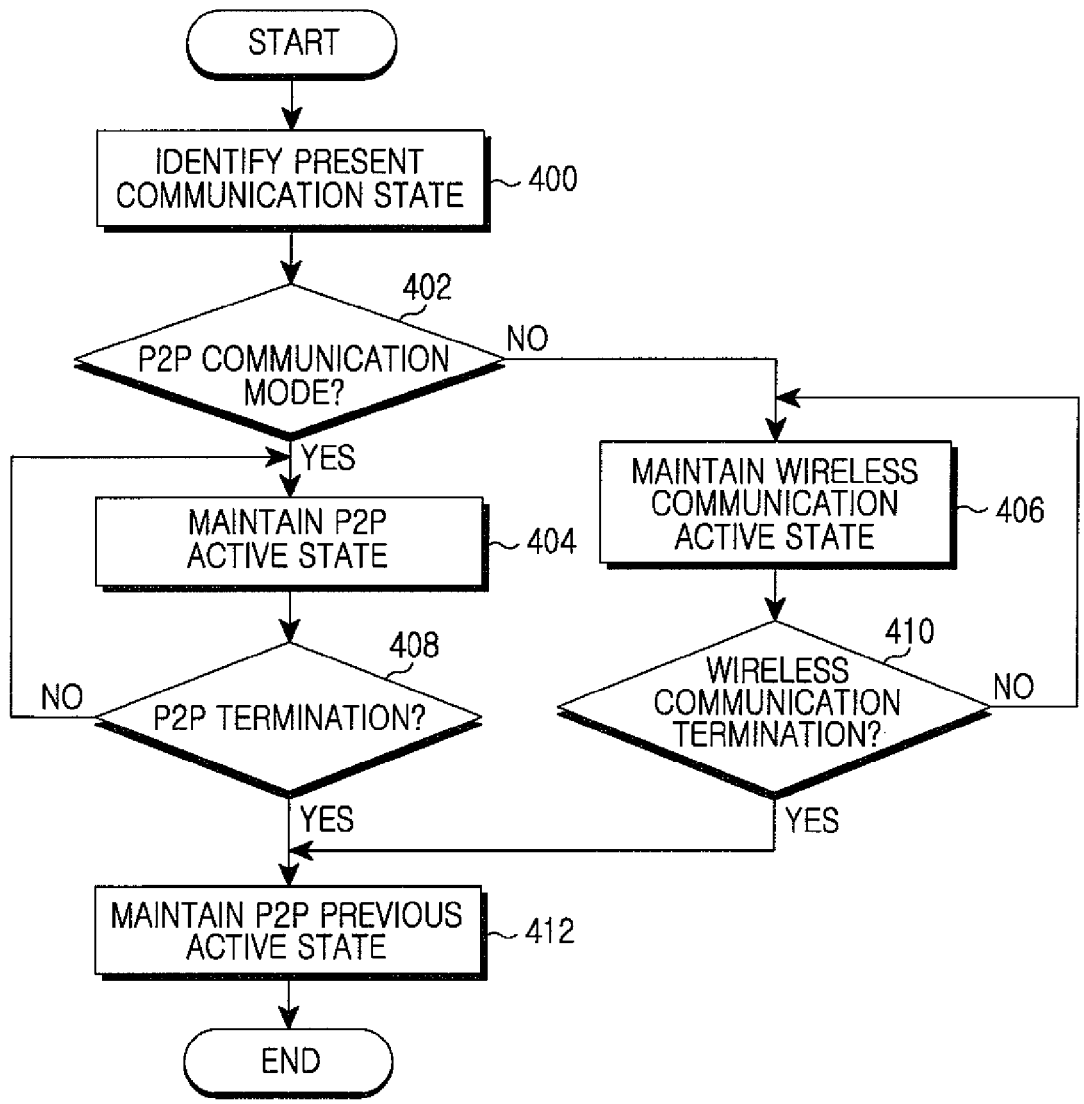
FIG. 4 is a flow diagram illustrating a process of a state transition of an MS in a wireless communication system according to an exemplary embodiment of the present invention.

FIG. 4 is a flow diagram illustrating a process of a state transition of an MS in a wireless communication system according to an exemplary embodiment of the present invention.

Referring to FIG. 4, in step 400, an MS identifies whether it is in a wireless communication active state where radio resources can be allocated in a first MAC layer, a P2P active state where radio resources can be allocated in a MAC layer for a P2P communication, or a P2P previous active state where a beacon message sent by a peer MS for a P2P communication can be received.

Then, if the P2P active state is identified in step 402, the MS maintains the P2P active state until a P2P communication is terminated in step 404. Then, upon P2P communication termination of step 408, the MS maintains the P2P previous active state in step 412.

If the wireless communication active state is identified in the step 402, the MS maintains the wireless communication active state until a wireless communication is terminated in step 406. Then, upon wireless communication termination of step 410, the MS maintains the P2P previous active state in the step 412. Thus, the MS is ready to receive a control message for a wireless communication and a control message for a P2P communication in the P2P previous active state.

Then, the MS terminates the process of the exemplary embodiment of the present invention.

As described above, exemplary embodiments of the present invention have an advantage of being able to efficiently provide a P2P connection by processing a P2P communication request message even if an MS is in a sleep mode or an inactive mode, by applying a P2P previous active mode to the inactive or idle mode of the MS. That is, a BS and the MS may automatically execute P2P connection with no need for a user's manual change into a P2P mode. Also, exemplary embodiments of the present invention can solve a power consumption problem of an MS occurring when always monitoring a P2P request signal transmitted by a neighboring MS, while allowing the BS and the MS to automatically establish a rapid P2P communication connection.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for supporting a Peer-to-Peer (P2P) communication in a wireless communication system, the method comprising:
   identifying whether a Mobile Station (MS) is in a wireless communication state, a P2P state, or an idle state in which the MS operates in neither the wireless communication state nor the P2P; and
   transiting to the P2P state when a control message for a P2P communication occurs in the idle state, and transiting to the wireless communication state when a control message for a wireless communication occurs in the idle state,
   wherein the wireless communication state includes a wireless communication active state in which radio resources may be allocated in a first Medium Access Control (MAC) layer, and a wireless communication sleep state in which a call is open without transmission or reception of data,
   wherein the P2P state includes a P2P active state in which radio resources can be allocated in a MAC layer for a P2P communication, and a P2P sleep state in which a call is open with no data reception or transmission, and
   wherein the idle state includes a P2P previous active state in which a beacon message sent by a peer MS can be received.

2. The method of claim 1, further comprising transmitting to the P2P previous active state when a P2P termination occurs in the P2P active state.

3. The method of claim 2, further comprising:
   transiting to the wireless communication active state when a paging or bandwidth request occurs in the P2P previous active state; and
   transiting to the P2P previous active state when a call termination occurs in the wireless communication active state.

4. The method of claim 3, wherein the transiting to the wireless communication comprises maintaining the wireless communication active state until a call is terminated in the wireless communication active state.

5. The method of claim 2, wherein an MS transits to the P2P previous active state from the wireless communication active state when the MS is in a state where there is no communication for a preset period of time, a call of the MS is correctly terminated, or the MS is in a state where there is no communication for a preset period of time after the call of the MS is correctly terminated.

6. The method of claim 2, wherein an MS transits to the P2P previous active state from the P2P active state when the MS is in a state where there is no communication for a preset period of time, a P2P communication of the MS is correctly terminated, or the MS is in a state where there is no communication for a preset period of time after the P2P communication of the MS is correctly terminated.

7. The method of claim 2, wherein the P2P active state comprises a Receive/Transmit (RxTx) state where data is actually received/transmitted and a P2P sleep state where a call is opened without data transmission/reception.

8. The method of claim 7, wherein an MS transits to the P2P sleep state when a resource is released in the RxTx state and transits to the RxTx state when a resource is allocated in the P2P sleep state.

9. The method of claim 2, wherein the wireless communication active state comprises an RxTx state where data is actually received/transmitted and a sleep state where a call is opened without data transmission/reception.

10. The method of claim 9, wherein an MS transits to the sleep state when a resource is released in the RxTx state and transits to the RxTx state when a resource is allocated in the sleep state.

11. The method of claim 2, further comprises maintaining the P2P active state until a P2P communication is terminated in the P2P active state.

12. An apparatus for supporting a Peer-to-Peer (P2P) communication in a wireless communication system, the apparatus comprising:

a controller for identifying whether a Mobile Station (MS) is in a wireless communication state, a P2P state, or an idle state in which the MS operates in neither the wireless communication state nor the P2P state; and transiting to the P2P state when a control message for a P2P communication occurs in the idle state and transiting to the wireless communication state when a control message for a wireless communication occurs in the idle state, wherein the wireless communication state includes a wireless communication active state in which radio resources may be allocated in a first Medium Access Control (MAC) layer, and a wireless communication sleep state in which a call is open without transmission or reception of data, wherein the P2P state includes a P2P active state in which radio resources can be allocated in a MAC layer for a P2P communication, and a P2P sleep state in which a call is open with no data reception or transmission, and wherein the idle state includes a P2P previous active state in which a beacon message sent by a peer MS can be received.

* * * * *